United States Patent [19]

Tanigawa

[11] Patent Number: 4,896,304

[45] Date of Patent: Jan. 23, 1990

[54] OBJECT DETECTING SYSTEM USING ULTRASONIC WAVES

[75] Inventor: Hiroshi Tanigawa, Tokyo, Japan

[73] Assignee: NEC Corporation, Tokyo, Japan

[21] Appl. No.: 359,341

[22] Filed: May 31, 1989

Related U.S. Application Data

[63] Continuation of Ser. No. 143,289, Jan. 7, 1988, which is a continuation of Ser. No. 15,523, Feb. 13, 1987, abandoned, which is a continuation of Ser. No. 699,200, Feb. 7, 1985, abandoned.

[30] Foreign Application Priority Data

| Feb. 7, 1984 | [JP] | Japan | 59-20290 |
| Feb. 7, 1984 | [JP] | Japan | 59-20291 |
| Feb. 7, 1984 | [JP] | Japan | 59-20292 |
| Feb. 7, 1984 | [JP] | Japan | 59-20295 |
| Feb. 7, 1984 | [JP] | Japan | 59-20296 |
| Feb. 7, 1984 | [JP] | Japan | 59-20297 |

[51] Int. Cl.$^4$ .............................. G01S 15/06
[52] U.S. Cl. ........................ 367/103; 367/105; 367/138
[58] Field of Search ............ 367/103, 105, 138, 7, 367/11; 73/626

[56] References Cited

U.S. PATENT DOCUMENTS

| 3,918,024 | 11/1975 | Macovski | 367/7 |
| 4,152,678 | 5/1979 | Shott et al. | 367/103 |
| 4,173,007 | 10/1979 | McKeighen et al. | 367/11 |
| 4,180,791 | 12/1979 | Tiemann | 367/7 |
| 4,460,987 | 7/1984 | Stokes et al. | 367/103 |

OTHER PUBLICATIONS

"Microprocessors and Programmed Logic", Short, Prentice-Hall, Inc., pp. 33, 481-486 (1981).
"Microcomputing Interfacing", Stone, Addison-Wesley Publishing Co., Inc., pp. 68, 69, 214, 215, 226 & 227 (1982).

Primary Examiner—Thomas H. Tarcza
Assistant Examiner—Daniel T. Pihulic
Attorney, Agent, or Firm—Burns, Doane, Swecker & Mathis

[57] ABSTRACT

An object detecting system including an ultrasonic transducer element array including first to N-th ultrasonic transducer elements, a first means for intermittently supplying burst driving pulses to the ultrasonic transducer elements at different times in each of successive intermittent periods. Also, the object detecting system includes a second means coupled between each of the first to N-th ultrasonic transducer elements and the first means for applying the burst driving pulses to the first to N-th ultrasonic transducer elements, successively. The second means includes first to N-th delay circuits which delay applying the burst driving pulses to the ultrasonic transducer elements with the first to N-th delay circuits giving different delay time periods, respectively, so that the delay time periods are successively longer in the order from the first delay circuit to the N-th delay circuit and each of the ultrasonic transducer elements is supplied with the burst driving pulse through two kinds of the delay circuits connected in parallel in such a manner that the M-th number of the ultrasonic transducer elements is coupled with the M-th and (N−M+1) th delay circuits, with M being a number from one to N.

5 Claims, 8 Drawing Sheets

OBJECT DETECTING SYSTEM USING ULTRASONIC WAVES

This application is a continuation of copending application Ser. No. 143,289, filed Jan. 7, 1988, which is a continuation of application Ser. No. 015,523, filed Jan. 13, 1987, now abandoned, which is a continuation of application Ser. No. 699,200, filed Feb. 7, 1985, now abandoned.

This invention relates to an object detecting system in which an object is detected by using ultrasonic waves.

It has been known in controlling a robot apparatus that it is possible to expand an applicable field of a playback type robot apparatus by using a sensor output signal. Heretofore playback type robot apparatuses have had a restriction that an object to be processed thereby must be at a predetermined position and attitude. The restriction can be lightened if the position and attitude of the object can be accurately detected by sensor means installed in the robot apparatus. A robot apparatus, in which processing sequence and content are autonomously determined in response to the sensor output signal from such sensor means, has been known as an intelligent robot apparatus.

A key for realizing such intelligent robot apparatus is to provide a practical sensor means. One such sensor means is an approach sensor for detecting a distance between the object and the sensor. For the approach sensor there have been proposed many types, for example, an ultrasonic-wave sensor, a sensor utilizing a coil-capacitor resonant circuit, and a sensor using an eddy current.

The ultrasonic-wave sensor comprises an ultrasonic transmitter and an ultrasonic receiver. The transmitter transmits a directional ultrasonic wave, which is then reflected by the object and received by the receiver. The ultrasonic-wave sensor has the advantage that it is possible to use as a material of the object not only a metal but also plastic and wood.

The ultrasonic-wave sensor has been used in the field of electronic medical diagnosis. However, heretofore an ultrasonic-wave sensor designed for use as an electronic medical diagnosis apparatus could not be applied to the playback type robot apparatus.

It is, therefore, an object of the invention to provide an object detecting system using ultrasonic waves capable of being applied to a playback type robot apparatus as an approach sensor.

According to the present invention, there is provided an object detecting system including an ultrasonic transducer element array including first to N-th ultrasonic transducer elements, a first means for intermittently supplying burst driving pulses to the ultrasonic transducer elements at different times in each of successive intermittent periods. Also, the object detecting system includes a second means coupled between each of the first to N-th ultrasonic transducer elements and the first means for applying the burst driving pulses to the first to N-th ultrasonic transducer elements, successively. The second means includes first to N-th delay circuits which delay applying the burst driving pulses to the ultrasonic transducer elements with the first to N-th delay circuits giving different delay time periods, respectively, so that the delay time periods are successively longer in the order from the first delay circuit to the N-th delay circuit and each of the ultrasonic transducer elements is supplied with the burst driving pulse through two kinds of the delay circuits connected in parallel in such a manner that the M-th number of the ultrasonic transducer elements is coupled with the M-th and (N−M+1) the delay circuits, with M being a number from one to N.

Other features and advantages of this invention will be apparent from the following detailed description of preferred embodiments of this invention, taken in conjunction with the accompanying drawings, wherein.

Figure 1:
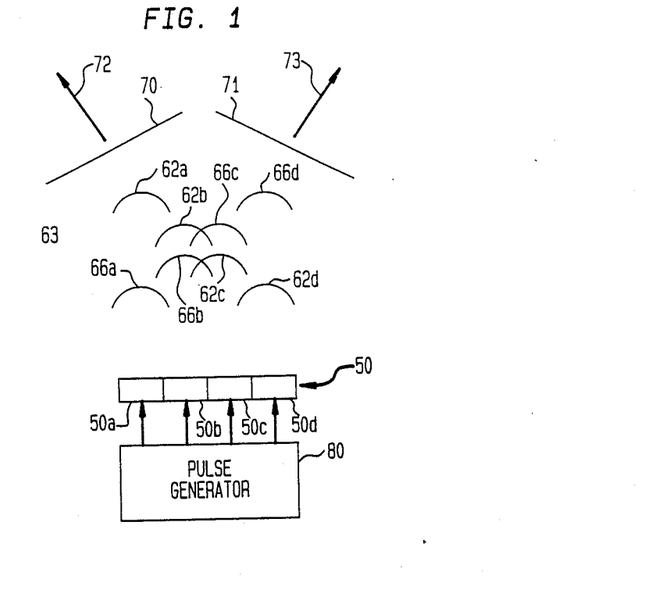
FIG. 1 schematically shows an ultrasonic wave transmitter used in a first embodiment of this invention.

Referring to FIG. 1, an ultrasonic wave transmitter used in the first embodiment of this invention comprises a transmitting ultrasonic element array 50 composed of ultrasonic elements 50a, 50b, 50c and 50d for transmitting ultrasonic waves, and a driving pulse generator 80 for generating driving pulses 51a, 51b, 51c and 51d (FIG. 2) to be applied to the ultrasonic elements 50a, 50b, 50c and 50d, respectively. The ultrasonic elements 50a, 50b, 50c and 50d may use conventional elements made of, for example, piezo-electric material, electrostrictive material and magnetostrictive material.

Figure 2:
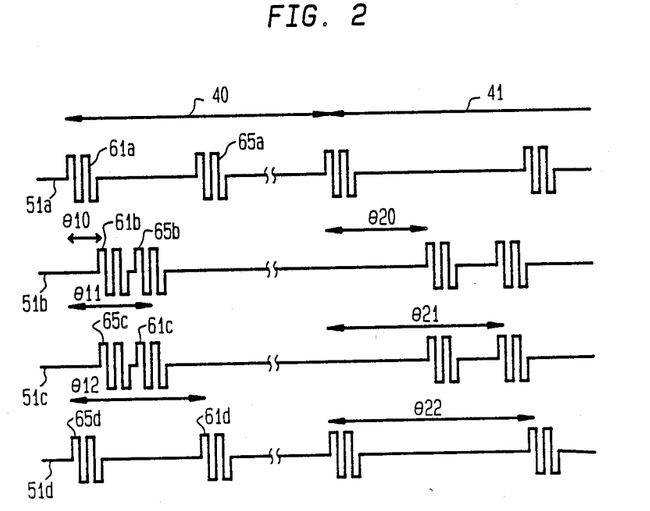
FIG. 2 shows pulse waveforms of driving pulses to be applied to the ultrasonic wave transmitter shown in FIG. 1.

The driving pulses 51a, 51b, 51c and 51d are intermittently generated burst pulses. To each of elements in the ultrasonic element array 50, in an intermittent period 40, two groups of burst pulses are applied. More specifically, the burst pulses 61a and 65a are applied to the element 50a, the burst pulses 61b and 65b to the element 50b, the burst pulses 65c and 61c to the element 50c, and the burst pulses 65d and 61d to the element 50d. The ultrasonic elements 50a, 50b, 50c and 50d transmit ultrasonic waves, having wave surfaces 62a and 66a, 62b and 66b, 66c and 62c, and 66d and 62d. The wave surfaces 62a, 62b, 62c, 62d, 66a, 66b, 66c and 66d correspond to the driving pulses 61a, 61b, 61c, 61d, 65a, 65b, 65c, and 65d, respectively.

Because the wave surfaces are combined with each other in an ultrasonic wave transmission medium 63, combined wave surfaces 70 and 71 result from the interference of wave surfaces 66a to 66d and 62a to 62d, respectively. The combined wave surfaces 70 and 71 are advanced in radiation directions 72 and 73, respectively.

Figure 3A:
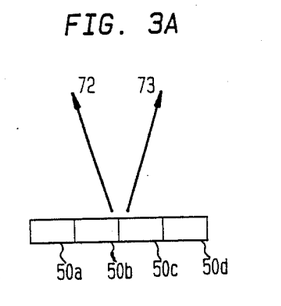
FIGS. 3(A) and 3(B) show radiation directions of ultrasonic waves for illustrating an operation of the embodiment.
Figure 3B:
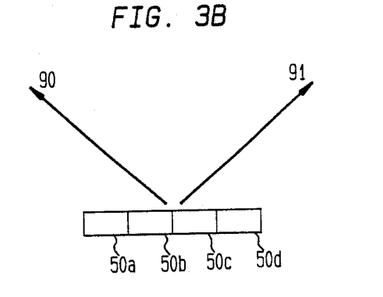

By controlling time differences between the driving pulses 51a, 51b, 51c and 51d in the intermittent period 40, it is possible to provide the combined wave surfaces (for example, 70 and 71) having desired radiation (for example, 72 and 73). In other words, in the following intermittent period 41, the time differences between the driving pulses 51a, 51b, 51c and 51d are different from those in the intermittent period 40. More specifically, the delay times $\theta_{20}$, $\theta_{21}$ and $\theta_{22}$ from the pulse 61a in the intermittent period 41 are greater than the delay times $\theta_{10}$, $\theta_{11}$ and $\theta_{12}$ in the intermittent period 40, respectively. Therefore, the radiation directions of the combined wave surfaces are changed so that an angle between the radiation directions of the combined wave surfaces in the intermittent period 41 becomes greater than that in the intermittent period 40 as shown by reference numerals 90 and 91 in FIG. 3(B). This means that it is possible to change the radiation directions of the combined wave surfaces by changing the time difference between the driving pulses to be applied to the ultrasonic element array 50 in each intermittent period every intermittent period.

In the first embodiment, because the ultrasonic element array 50 transmits simultaneously two ultrasonic waves (for exampe, waves corresponding to the surfaces 62a and 66d, to 62b and 66c, to 66b and 62c, and to 66a and 62d), it is possible to simultaneously scan two directions in each intermittent period. If the ultrasonic element array transmits simultaneously three or more ultrasonic waves, it is possible to simultaneously scan three or more directions in each intermittent period. This makes it possible to decrease the number of intermittent periods for scanning the desired whole scanning directions to a half, one-third and so on. This means that, when this embodiment is applied to the playback type robot apparatus as an approach sensor, the operating speed of a working arm of a robot apparatus can be increased.

It is noted that the number of the ultrasonic elements is not limited to the number described in the above embodiment. The ultrasonic elements can be arranged two-dimensionally. Further, the pulse frequency and the pulse shape in the driving pulses are not limited to those previously described. Although the amplitude of the driving pulses are constant in the above embodiment, it is possible to use driving pulses having different amplitudes or to change the amplitudes of the driving pulses every intermittent period.

In the case where two ultrasonic waves are simultaneously transmitted from the ultrasonic element array composed of odd-numbered ultrasonic elements, it is desirable that an amplitude of the ultrasonic wave of one of the elements be twice that of the other ultrasonic waves transmitted from the other ultrasonic elements, from each of which two ultrasonic waves are transmitted at different times in the intermittent period.

In the first embodiment, the time difference Ta between the pulses 61a, and 65a is equal to the time difference Td between the pulses 65d and 61d, and the time difference Tb between the pulses 61b and 65b to the time difference Tc between the pulses 65c and 61c in each intermittent period. The time differences Ta, Tb, Tc and Td may be different from each other so that the radiation directions (72 and 73 in FIG. 1) become asymmetrical to each other and the wave surfaces become concave to focus the ultrasonic waves to a specific position.

Figure 4:
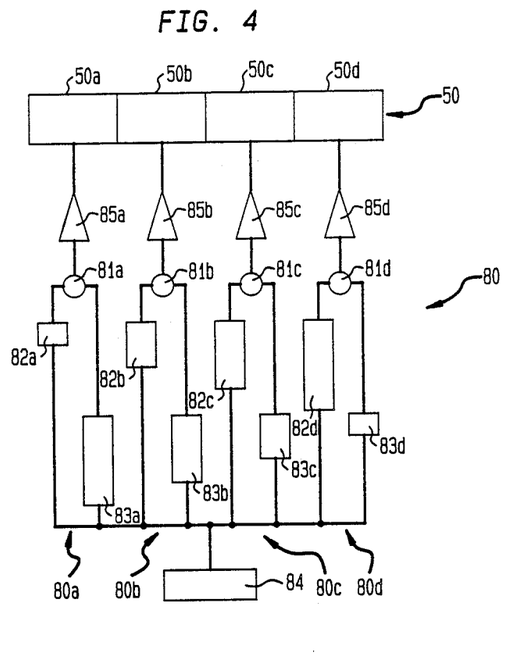
FIG. 4 is a block diagram of a driving pulse generator used in the first embodiment.

Referring to FIG. 4, the driving pulse generator 80 comprises driving pulsers 80a, 80b, 80c and 80d, and an oscillator 84. Each driving pulser (80a, 80b, 80c, 80d) has variable delay circuits 82a and 83a, 82b and 83b, 82c and 83c, and 82d and 83d, an adder circuit 81a, 81b, 81c, 81d, and an amplifier 85a, 85b, 85c, 85d coupled to the ultrasonic element array 50a, 50b, 50c, 50d. The driving pulsers are identical to each other except that the delay time combinations of the delay circuits 82 and 83 are different in every pulser.

Figure 5:
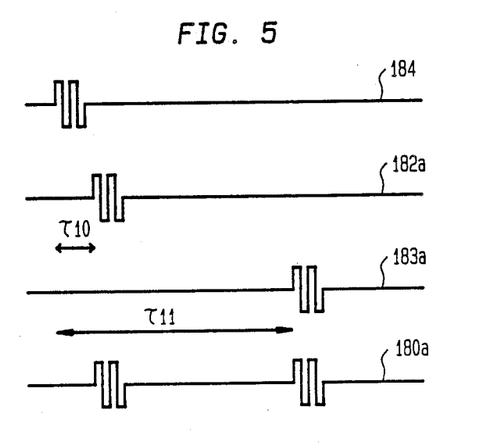
FIG. 5 shows pulse waveforms of pulses appearing at various parts of the driving pulse generator shown in FIG. 4.

An operation of the pulser 80a will be described with reference to FIG. 5 (Operation of the pulsers 80b, 80c and 80d is omitted for simplicity). The burst pulse 184 is applied to the delay circuits 82a and 83a having a variable delay times $\tau_{10}$ and $\tau_{11}$ to provide delayed pulses 182a and 183a, respectively. The delayed pulses 182a and 183a are supplied to the adder circuit 81a to provide the pulse 180a, which is then amplified and shaped by the amplifier 85a to obtain the driving pulse to be applied to the ultrasonic element 50a.

Figure 6:
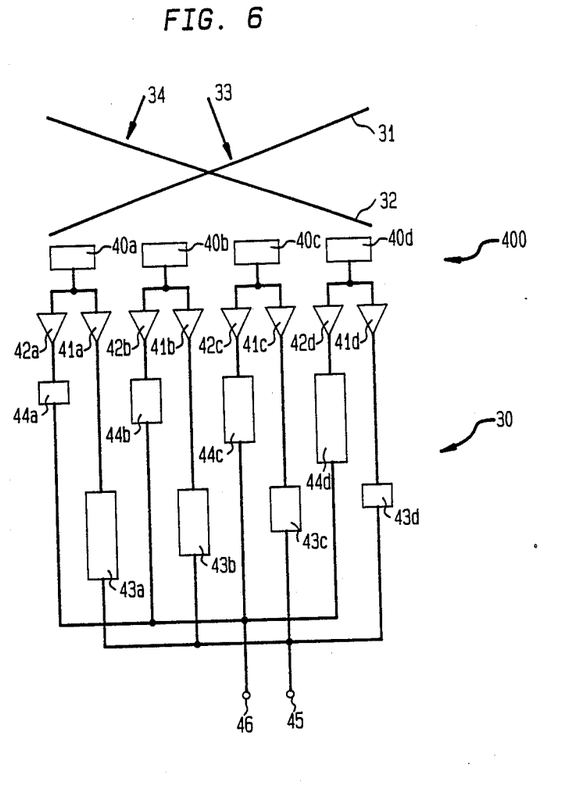
FIG. 6 schematically shows an ultrasonic wave receiver used in the first embodiment.

Referring to FIG. 6, an ultrasonic wave receiver used in the first embodiment comprises a receiving ultrasonic element array 400 composed of ultrasonic elements 40a, 40b, 40c and 40d for receiving an ultrasonic wave and converting it to an electric signal, and a signal processor 30. The signal processor 30 is composed of signal processing circuits 30a, 30b, 30c and 30d each comprising amplifiers 41a and 42a, 41b and 42b, 41c and 42c, 41d and 42d, and variable delay circuits 43a and 44a, 43b and 44b, 43c and 44c, 43d and 44d. The outputs of the delay circuits 43a to 43d are connected to an output terminal 45, and the outputs of the delay circuits 44a to 44d are connected to an output terminal 46. The variable delay times for the variable delay circuits 43 and 44 are set to correspond to the delay times for the variable delay circuits 82 and 83 in the ultrasonic wave transmitter (FIG. 4) in order to coincide the directivities for the ultrasonic wave transmitter and the ultrasonic wave receiver with each other.

The transmitted ultrasonic waves from the ultrasonic wave transmitter (FIG. 1) are reflected by objects to provide reflected waves having wave surfaces 31 and 32 and incoming directions 33 and 34, respectively. In practice, though the shapes of the wave surfaces 31 and 32 are of circular arc, they can be considered as linear as shown in FIG. 6 when a distance between the object and the ultrasonic element array is sufficiently greater than a dimension of the ultrasonic element array.

With respect to the reflected wave 31, the ultrasonic wave detection is made first by the ultrasonic element 40a and last by the ultrasonic element 40d. On the other hand, as to the reflected wave 32, the detection is made first by the ultrasonic element 40d and last by the ultrasonic element 40a. Time differences between the received times for the ultrasonic elements 40a, 40b, 40c and 40d are compensated by the signal processor 30 to detect the ultrasonic waves 31 and 32 as if no time difference is detected.

Figure 7:
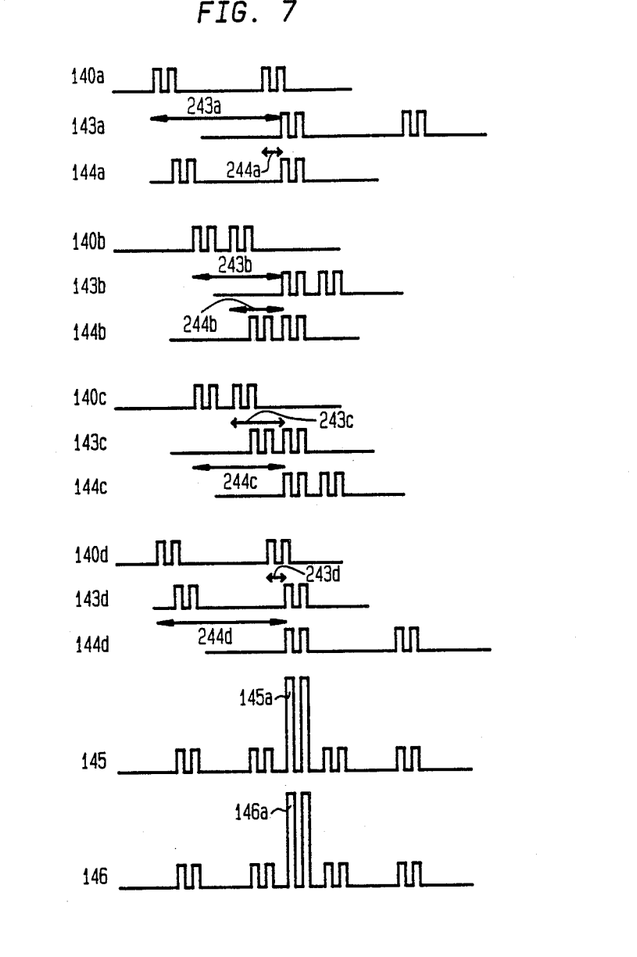
FIG. 7 shows waveforms of pulses appearing at various parts of a signal processor used in the ultrasonic receiver.

An operation of the ultrasonic wave receiver will be described with reference to FIG. 7. The reflected ultrasonic waves 31 and 32 are received and converted, by the ultrasonic elements 40a, 40b, 40c and 40d, to received electric signals 140a, 140b, 140c and 140d, respectively. The received signals 140a, 140b, 140c and 140d are shaped and amplified by the amplifiers 41a, 41b, 41c and 41d and then delayed by the variable delay circuits 43a, 43b, 43c and 43d, whose delay times 243a, 243b, 243c and 243d have been set in relation to those for the delay circuits 83a, 83b, 83c and 83d (FIG. 4), to provide delayed signals 143a, 143b, 143c and 143d, respectively. The delayed signals 143a, 143b, 143c and 143d are added to each other to provide at the output terminal 45 an output signal 145 having a large amplitude pulse 145a. The large amplitude pulse 145a corresponds to the ultrasonic wave 31 having the incoming direction 33 which is equal to a direction defined by the combination of the delay times 243a, 243b, 243c and 243d for the delay circuits 43a, 43b, 43c and 43c. This means that the receiver has a directivity in the direction defined by the combination of the delay times 243a, 243b, 243c and 243d.

The received signals 140a, 140b, 140c and 140d are also shaped and amplified by the amplifiers 42a, 42b, 42c and 42d and then delayed by the variable delay circuits 44a, 44b, 44c and 44d, whose delay times 244a, 244b, 244c and 244d have been set in relation to those for the delay circuits 82a, 82b, 82c and 82d (FIG. 4), to provide delayed signals 144a, 144b, 144c and 144d, respectively. The delayed signals 144a, 144b, 144c and 144d are added to each other to provide at the output terminal 46 an output signal 146 having a large amplitude pulse 146a. The large amplitude pulse 146a corresponds to the ultrasonic wave 32 having the incoming direction 34 which is equal to a direction defined by the combination of the delay times 244a, 244b, 244c and 244d for the delay circuits 44a, 44b, 44c and 44d. This means that the receiver has a directivity in the direction defined by the combination of the delay times 244a, 244b, 244c and 244d.

As clearly understood from the above description, it is possible to change the directivity of the receiver by changing the delay times of the delay circuits 43 and/or 44 every intermittent period.

Figure 8:
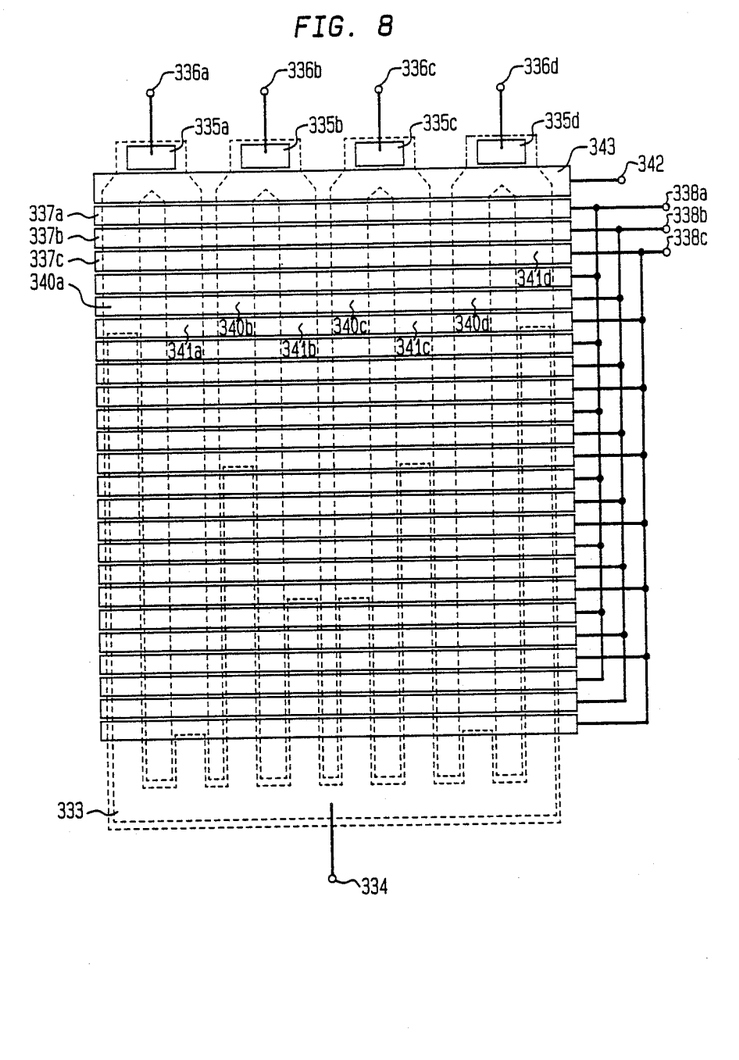
FIG. 8 shows a detail of a portion of the driving pulse generator shown in FIG. 4.

Referring to FIG. 8 showing a detail of a portion of the driving pulse generator (FIG. 4), the adder circuits 81a, 81b, 81c, 81d and the variable delay circuits 82a and 83a, 82b and 83b, 82c and 83c, 82d and 83d are made of three-phase transfer type charge coupled devices. In an input diffusion layer area 33, an input terminal 334 is provided for connecting to the oscillator 84 (FIG. 4). In output diffusion layer areas 335a, 335b, 335c and 335d, output terminals 336a, 336b, 336c and 336d are provided for connecting to the amplifiers 85a, 85b, 85c and 85d (FIG. 4), respectively. Transfer electrodes 337a, 337b and 337c are connected to terminals 338a, 338c and 338c, to which three-phase transfer or clocking pulses are applied. An output gate electrode 343 is connected to a terminal 342 connected to a DC voltage source. Channel areas 340a, 340b, 340c, 340d and 341a, 341b, 341c, 341d correspond to the delay circuits 82a, 82b, 82c, 82d and 83a, 83b, 83c, 83d, respectively. These channel areas are positioned between the input diffusion layer area 333 and the output diffusion layer areas 335a, 335b, 335c, 335d, and the numbers of the transfer electrodes in the channel areas 340a, 340b, 340c, 340d, 341a, 341d, 341c and 341d are 6, 12, 18, 24, 24, 18, 16, 12 and 6, respectively. Because of the three-phase transfer clocking pulses, the element numbers in the respective areas are 2, 4, 6, 8, 8, 6, 4 and 2. This means that delay circuits 82a, 82b, 82c, 82d, 83a, 83b, 83c and 83d are composed of analogue delay circuits constituted by 2-, 4-, 6-, 8-, 8-, 6-, 4-, and 2-element charge coupled devices. With this arrangement, when the transfer pulses of 100 KHz are applied to the transfer electrodes 338a, 338b, and 338c, respectively, the channel areas 340a, 340b, 340c, 340d, 341a, 341b, 341c and 341d provide delay times of 20, 40, 60, 80, 80, 60, 40, and 20 microseconds. When 1 MHz is used, the delay times are 2, 4, 6, 8, 8, 6, 4 and 2 microseconds. The delay times of the channel areas 340a–340d and 341a–341d can be controlled by controlling the frequency of the three-phase transfer pulses to be applied to the transfer electrodes 338a–338c.

Figure 9:
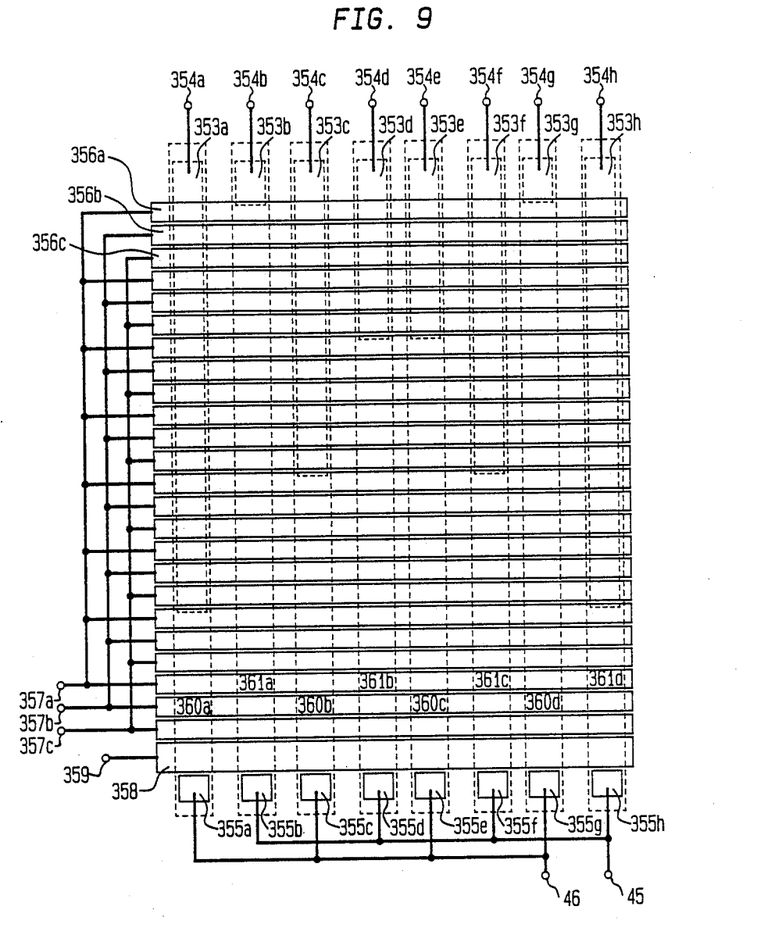
FIG. 9 shows a detail of a portion of the signal processor shown in FIG. 6.

Referring to FIG. 9 showing a detail of a portion of the signal processor 30 (FIG. 6), the variable delay circuits 43a and 44a, 43b and 44b, 43c and 44c, 43d and 44d are made of charge coupled devices. In input diffusion layer areas 353a, 353b, 353c, 353d, 353e, 353f, 353g, and 353h, input terminals 354a, 354b, 354c, 354d, 354e, 354f, 354g and 354h are provided for connecting to the ultrasonic element array 40. The output terminal 45 is connected to output diffusion layer areas 355b, 355d, 355f and 355h, and the output terminal 46 is connected to output diffusion layer areas 355a, 355c, 355d and 355g. Transfer electrodes 365a, 365b and 356c are connected to terminals 357a, 357b and 357c, to which three-phase transfer pulses are applied. An output gate electrode 358 is connected to a terminal 359 connected to a DC voltage source. Channel areas 360a, 360b, 360c, 360d and 361a, 361b, 361c, 361d correspond to the delay circuits 44a, 44b, 44c, 44d and 43a, 43b, 43c, 43d, respectively. The numbers of the transfer electrodes in the channel areas 360a, 360b, 360c, 360d, 361a, 361b, 361c and 361d are 6, 12, 18, 24, 24, 18, 16, 12 and 6, respectively. Because of the three-phase transfer pulses, the element numbers in the respective areas are 2, 4, 6, 8, 8, 6, 4 and 2. This means that delay circuits 44a, 44b, 44c, 44d, 43a, 43b, 43c and 43d are composed of analogue delay circuits constituted by 2-, 4-, 6-, 8-, 8-, 6-, 4- and 2-element charge coupled devices. With this arrangement, when the transfer pulses of 100 KHz are applied to the transfer electrodes 357, the channel areas 360a, 360b, 360c, 360d, 361a, 361b, 361c and 361d provide delay times of 20, 40, 60, 80, 80, 60, 40 and 20 microseconds. When 1 MHz is used, the delay times are 2, 4, 6, 8, 8, 6, 4 and 2 microseconds. The delay times of the channel areas 360 and 361 can be controlled by controlling the frequency of the three-phase transfer pulses to be applied to the transfer electrodes 357.

Figure 10A:
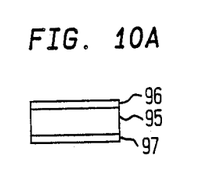
FIGS. 10(A) and 10(B) show examples of the ultrasonic element for use in the first embodiment.
Figure 10B:
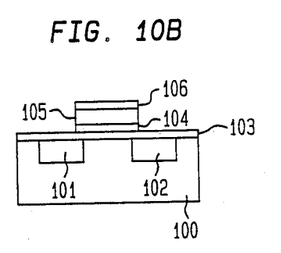

Referring to FIG. 10, there are shown two examples of an ultrasonic element for use in the ultrasonic element array 50 or 400. A first example shown in FIG. 10(A) comprises a piezo-electric element 95 made of ZnO, PZT, PLZT, AlN, PVDF and so on, and electrodes 96 and 97 formed on the piezo-electric element 95. The driving pulse is applied between the electrodes 96 and 97.

A second example shown in FIG. 10(B) comprises a silicon substrate 100, diffusion layers 101 and 102 having a conductivity reverse to that of the substrate 100, an insulating layer 103, electrodes 104 and 106, and a thin film piezo-electric element 105. The piezo-electric element 105 may be identical to the piezo-electric element 95. However, it is desired that it is made of ZnO or AlN for spattering.

Figure 11:
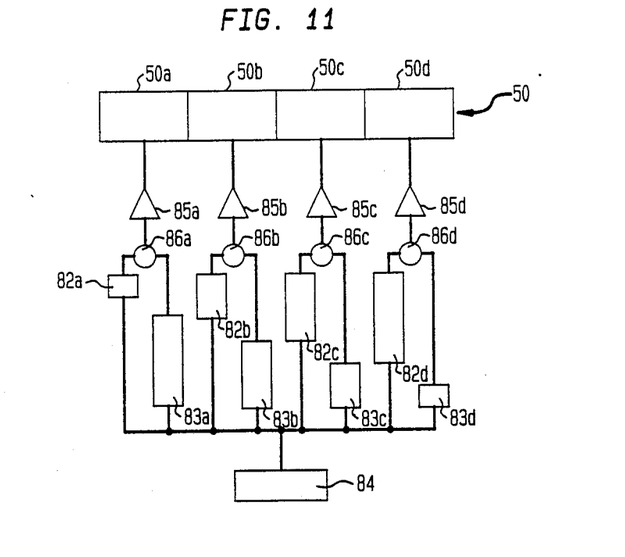
FIGS. 11 and 12 are block diagrams of driving pulse generators used in a second embodiment of this invention.
Figure 12:
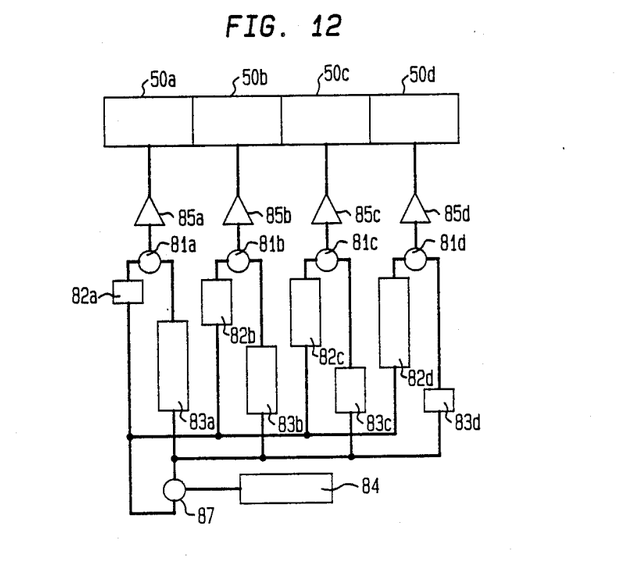

In the first embodiment, two ultrasonic waves 70 and 71 having the radiation directions 72 and 73 are transmitted in each intermittent period. According to a second embodiment, the two ultrasonic waves 70 and 71 can be transmitted in two continuous intermittent periods 40 and 41 by applying the driving pulses 61a, 61b, 61c and 61d to the ultrasonic elements 50a, 50b, 50c and 50d, respectively, with keeping this sequence in time in the period 40 and applying the driving pulses 65d, 65c, 65b and 65a to the ultrasonic elements 50d, 50c, 50b and 50a, respectively, with keeping this sequence in time in the period 41. For this purpose, in the second embodiment, the driving pulse generator 80 (FIG. 4) is modified so that the adder circuits 81 are replaced by switching circuits 86a, 86b, 86c, 86d (FIG. 11) for switching the outputs of the delay circuts 82 and 83 at the intermittent periods as shown in FIG. 11, or a switching circuit 87 for selectively supplying the output of the oscillator 84 to ones of the delay circuits 82 and 83 at the intermittent period is inserted between the oscillator 84 and the variable delay circuits 82 and 83, as shown in FIG. 12.

What is claimed is:

1. An object detecting system comprising:
   an ultrasonic transducer element array comprising first to N-th ultrasonic transducer elements;
   a first means for intermittently supplying burst driving pulses to said ultrasonic transducer elements at different times in each of successive intermittent periods; and
   a second means coupled between each of said first to N-th ultrasonic transducer elements and said first means for applying said burst driving pulses to said first to N-th ultrasonic transducer elements, successively, said second means comprising first to N-th delay circuits which delay applying said burst driving pulses to said ultrasonic transducer elements, said first to N-th delay circuits giving different delay time periods, respectively, so that said delay time periods are successively longer in the order from said first delay circuit to said N-th delay circuit, and each of said ultrasonic transducer elements being supplied with the burst driving pulse through two kinds of said delay circuits connected in parallel in such a manner that M-th number of said ultrasonic transducer elements is coupled with M-th and (N−M+1)-th delay circuits, with M being a number from one to N.

2. The object detecting system as claimed in claim 1, further comprising:
   an ultrasonic receiving element array comprising first to N-th ultrasonic receiving elements;
   a third means for detecting an ultrasonic wave received by said ultrasonic receiving element array, said third means having first to N-th delay means coupled with said first to N-th ultrasonic receiving elements, respectively, said first to N-th delay means giving the same delay time periods as said first to N-th delay circuits, respectively, and said third means further comprising a first output means combining the delayed signals obtained from said first to N-th delay means; and
   a fourth means for detecting an ultrasonic wave received by said ultrasonic receiving element array, said fourth means having (N+1)-th to (N+N)-th delay means coupled with first to N-th ultrasonic receiving elements, respectively, said (N+N)-th to (N+1)th delay means giving the same delay time periods as said first to N-th delay circuits, respectively, and said fourth means further comprising a second output means combining the delayed signal obtained from said (N+1)-th to (N+N)-th delay means.

3. The object detecting system as claimed in claim 1, wherein said ultrasonic transducer element array is a linear array in which said first to N-th ultrasonic transducer elements are arranged in a line.

4. The object detecting system as claimed in claim 3, wherein said two kinds of said delay circuits are coupled with the ultrasonic transducer element through an adding means for adding said burst driving pulses derived from said two kinds of said delay circuits.

5. The object detecting system as claimed in claim 4, wherein said second means is formed in a three-phase transfer type charge coupled device.

* * * * *